Feb. 19, 1957 W. GISKES 2,781,667
RECORD PLAYER
Filed May 19, 1955

INVENTOR
WILLEM GISKES
BY
AGENT

United States Patent Office 2,781,667
Patented Feb. 19, 1957

2,781,667
RECORD PLAYER

Willem Giskes, Eindhoven, Netherlands, assignor to Hartford National Bank and Trust Company, Hartford, Conn., as trustee Application May 19, 1955, Serial No. 509,613

Claims priority, application Netherlands May 20, 1954

3 Claims. (Cl. 74—206)

The invention relates to record players and more particularly to a friction wheel for driving a record player.

Friction wheels are described in co-pending application U. S. Ser. No. 410,604, filed February 16, 1954, to Willem Giskes having a running surface which is formed by a ring of elastic material in which in a radial direction behind the running surface over at least part of the width thereof there is no support of the material of the ring or of the wheel. Friction wheels of the aforesaid kind exhibit a large deformability in a radial direction since in this direction the ring material is loaded primarily by bending.

It is a common practice to arrange a friction wheel in a talking machine between the motor shaft and the turntable, the arrangement being preferably such that owing to the direction of rotation of the motor shaft the friction wheel is clamped between this shaft and the turntable. Due to inertia forces, the aforesaid clamping force will prevail to a great extent when the turntable is started and the velocity of the turntable is changed from a low value to a high value especially with a talking machine having automatic record changing during the changing period. With the kind of friction wheels to which the invention relates there is the risk that this wheel, owing to its great deformability, will slip out between the motor shaft and the turntable. In this respect it is desirable to reduce considerably the radial deformability.

According to the invention, the deformability in a radial direction is restricted by a separate supporting body provided behind the running surface made of a non-elastic material.

In this manner the distance over which a radial deformation can take place may be chosen to be of any desired value. The ring and the supporting body are two separate parts which can be readily made to any desired size and then joined. By manufacturing the separate supporting body from non-elastic material the distance over which the ring can be deformed is fixed within very narrow limits.

According to a further aspect of the invention the distance between the ring and the separate supporting body is approximately 0.5 mm. Such a distance ensures a sufficient movability for the running surface of the ring, while the risk of the friction wheel being jammed between the motor shaft and the turntable is overcome in the case of such a small distance. Moreover, the energy supplied by the driving motor is converted only for a very small part into deformation energy for the friction wheel. This is particularly of importance for record players having automatic record changing, since during the changing period the maximum quantity of energy must be available.

The separate supporting body of the present invention is preferably constituted by a metal dish having a flanged edge since such a supporting body may be manufactured from sheet material in one operation and since the flanged edge permits of arranging the supporting body adjacent to the friction wheel on a common shaft.

With reference to the figures, which illustrate one embodiment of the invention, the invention will be described more fully.

Figure 1:
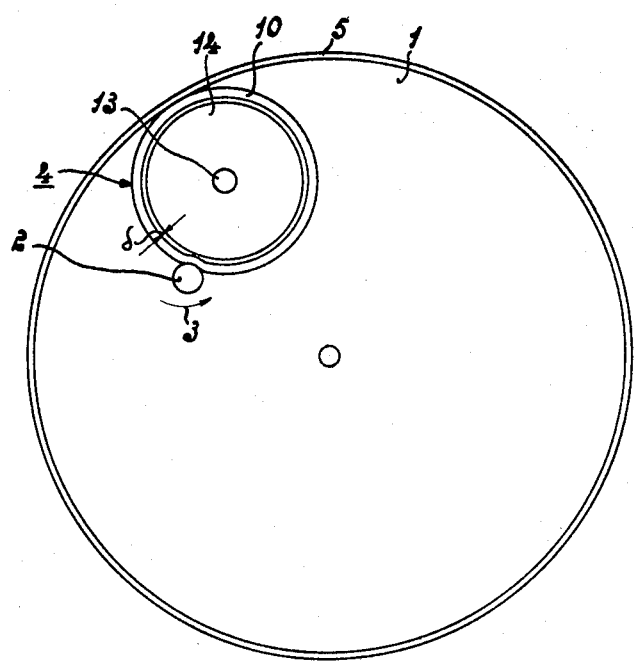
Fig. 1 is a plan view of the general arrangement of a friction wheel in a record player.
Figure 2:
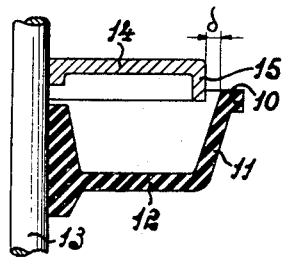
Fig. 2 is a sectional view of a friction wheel according to the invention.

Referring more particularly to the figures, a turntable 1 is operatively driven by a motor shaft 2 which is rotated in the direction of the arrow 3. Between the shaft 2 and the inside edge 5 of the turntable 1 provision is made of a friction wheel 4 which is freely movable in a circular path in the plane of the drawing. Due to the direction of rotation in the aforesaid sense the friction wheel 4 is clamped between the edge 5 of the turntable 1 and the shaft 2. The friction wheel 4 has a running surface 10 composed preferably of rubber. Behind this running surface there is no support, so that during a load of the running surface in a radial direction the surfaces 11 and 12 are bent. The shaft 13 of the friction wheel is surrounded by a metal dish 14, having a flanged edge 15, which lies just behind and spaced from the running surface 10. The distance $\delta$ between the flanged edge 15 and the running surface 10 is 0.5 mm.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A device for driving the rim of a record player turntable comprising a motor shaft, a hollowed friction wheel being provided with a shaft, a running surface on said friction wheel being constituted of a ring of elastic material, said friction wheel being drivingly engaged between said turntable rim and said motor shaft, and a separate supporting element on said friction wheel shaft located in said hollow and composed of a non-elastic material whereby the deformation of said running surface in a radial direction is limited.

2. A device as set forth in claim 1 wherein the distance between said ring and said separate supporting element is approximately 0.5 mm.

3. A device as set forth in claim 1 wherein said separate supporting element is a metal dish-shaped member having a peripheral flange.

References Cited in the file of this patent

UNITED STATES PATENTS

| | | |
|---|---|---|
| 1,399,329 | Vandercook | Dec. 6, 1921 |
| 1,979,561 | Lewis | Nov. 6, 1934 |
| 2,261,889 | Schneider | Nov. 4, 1941 |
| 2,572,718 | Gifford | Oct. 23, 1951 |